Oct. 29, 1940. W. C. STARKEY 2,219,877
CLUTCH CONSTRUCTION
Filed June 10, 1939
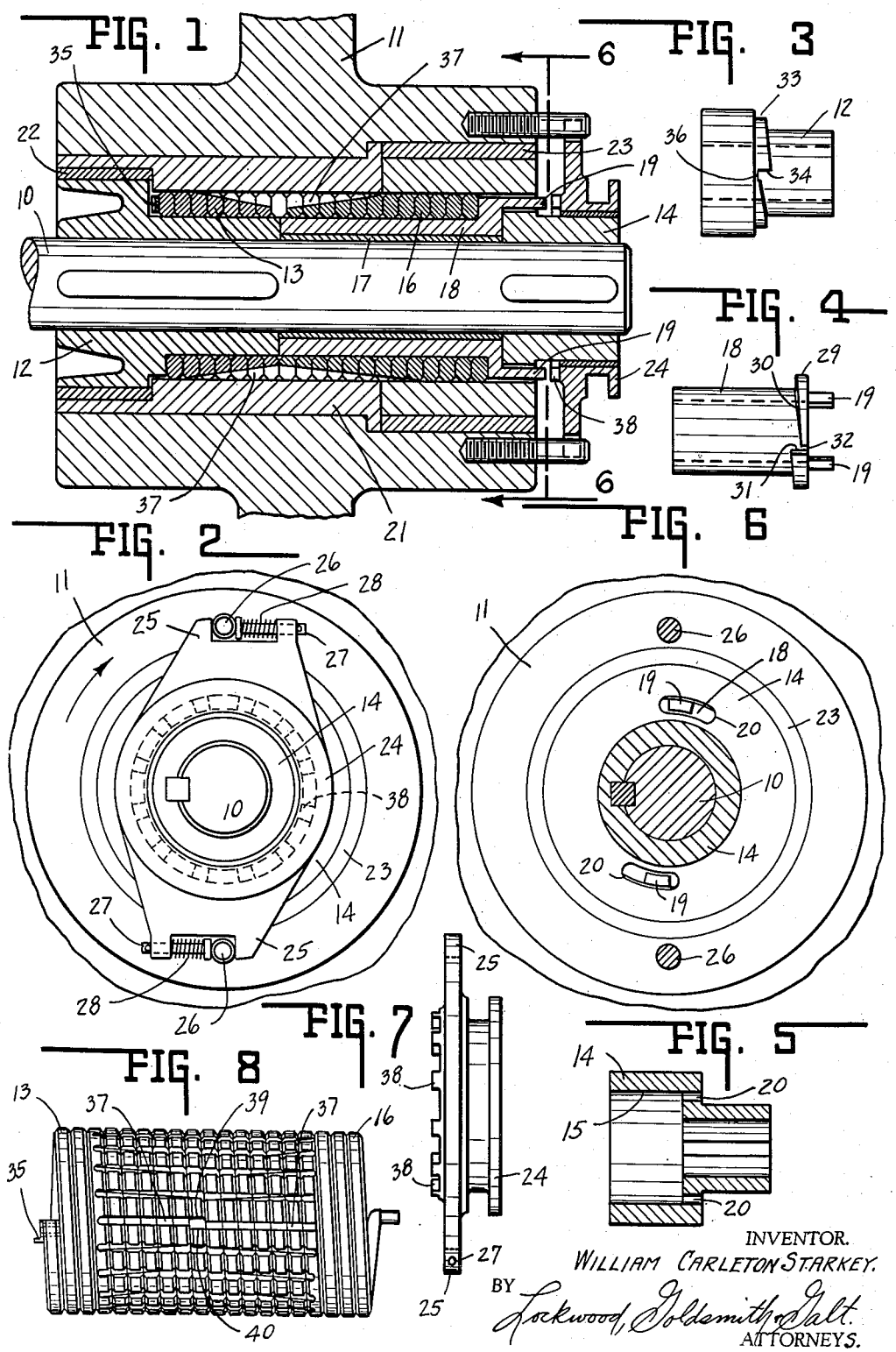
INVENTOR.
WILLIAM CARLETON STARKEY.
BY Lockwood, Goldsmith & Galt.
ATTORNEYS.

Patented Oct. 29, 1940

2,219,877

UNITED STATES PATENT OFFICE 2,219,877

CLUTCH CONSTRUCTION

William Carleton Starkey, Indianapolis, Ind., assignor to L. G. S. Spring Clutches, Incorporated, Indianapolis, Ind., a corporation Application June 10, 1939, Serial No. 278,401

4 Claims. (Cl. 192—35)

This invention relates to a clutch construction particularly adapted for heavy duty with extremely variable loads. An example of such use is on heavy punch presses where the load is at a maximum during the punching operation and suddenly falls to zero at the end of said operation and in which the clutch must be sensitive in operation and yet able to withstand heavy shocks in starting the load. While the invention is particularly applicable to punch presses, it is not to be limited to such use.

One object of the invention is to provide a clutch for heavy duty which can instantly pick up the load as a result of the application of a very small controlling force and is capable of withstanding the shocks incident to such operations.

Another object of the invention is to provide a clutch free from backlash which is usually the result of the sudden release of the forces applied at the end of a punching operation.

To accomplish these and other objects, the invention provides internal expanding spring clutch members of the general type described in my prior Patent No. 1,718,197 issued June 18, 1929, arranged to transmit heavy loads and to be actuated by a very small force. To prevent backlash two of said elements are provided, one of which acts as a clutch when power is transmitted from the normal driving member to the normal driven member and the other of which acts as a clutch when the direction of force is reversed at the times when backlash occurs in the usual clutch construction now employed. To provide for instantaneous change from the clutching action of one spring to that of the other the springs are arranged coaxially and their terminal coils are interengaged so that each applies an expanding actuating force to the other. By this means also the external actuating force may be applied through one spring to actuate the other.

Other objects and features of the invention will be understood from the accompanying drawing and the following description and claims:

Fig. 1 is a central longitudinal sectional view through a clutch construction embodying the invention. Fig. 2 is an end view thereof. Fig. 3 is an elevational view of one of the members of said construction. Fig. 4 is a similar view of another member. Fig. 5 is a sectional view of a spring pocket member with which one of the clutch springs is engaged. Fig. 6 is a sectional view taken on the line 6—6 of Fig. 1. Fig. 7 is an elevational view of a sliding clutch collar used for applying an external actuating force to the clutch. Fig. 8 is a plan view of the two clutch springs normally employed showing their interengagement.

In the drawing there is shown a driven member 10, which may be the crank shaft of the punch press, and a portion of a driving member 11, which may be the hub of the flywheel. The flywheel may be continuously rotated in the usual manner by a belt or by geared drive from a motor. A member 12 shown in detail in Fig. 3 is keyed to the shaft 10 against rotation and against axial movement and serves as a support for a driving clutch spring 13. A spring pocket member 14 shown in detail in Fig. 5 is similarly keyed to the outer end of the shaft 10 and is provided with a bore 15 serving as a spring pocket for a backlash clutch spring 16. A bushing 17 surrounds the shaft between the members 12 and 14 to retain the same accurately spaced apart. A sleeve 18 shown in detail in Fig. 4 surrounds the bushing 17 with a running fit and serves as a seat for the spring 16. Said sleeve is provided with a pair of projections 19 extending through openings 20 in the pocket member 14. The openings are of arcuate form as best seen in Fig. 6 and thus permit limited rotative movement of the sleeve 18 with respect to the pocket member 14 and the shaft 10.

A spring pocket bushing 21 is preferably pressed into the hub of the flywheel 11 and is splined to said hub. It is provided with an internal bore slightly larger in diameter than the normal unstressed diameter of the clutch springs 13 and 16. A pair of bearing bushings 22 and 23 are also pressed into the hub of the flywheel and rotatively support the same on the members 12 and 14 respectively. A clutch collar 24 is rotatively and slidably mounted on the hub of the member 14 and is provided with extensions 25 engaging pins 26 which are secured to the hub of the flywheel 11. The extensions 25 carry pins 27 which are held in engagement with the pins 26 by means of compression springs 28.

The member 18 is provided with a flange 29 (Fig. 4) having an inclined face 30 pitched at the same pitch as the spring 16. Said flange is provided with a shoulder 31 which serves as an abutment for the end of the outer coil of the spring. Said coil is bent outwardly as shown in Fig. 8 and enters a recess 32 in the flange 29. The member 12 is provided with a similar flange 33 having a shoulder 34 serving as an abutment for the outer end of the spring 13. Said spring has secured thereto a member 35 (Fig. 8) resting in a recess 36 to prevent backward rotation of the spring 13 with respect to the member 12. The free ends 39 and 40 of the inner terminal coils of the springs 13 and 16 respectively are interengaged as shown in Fig. 8 so that a clockwise (Fig. 2) torsional force applied to spring 16 is transmitted to spring 13 and tends to expand both springs. The springs themselves are preferably formed of substantially rectangular material with chamfered corners and with longitudinal grooves 37 increasing in depth toward the inner ends. The inner coils of each spring are therefore considerably more flexible than the outer coils.

In the operation of the clutch mechanism just described when the clutch is disengaged, the projections 19 float freely in the openings 20 and no torsional force is exerted on the springs. Since the outer diameter of the springs is slightly less than the inner diameter of the pocket bushing 21 the flywheel may rotate freely without rotating the shaft.

In the example illustrated in the drawing the flywheel is assumed to rotate in the clockwise direction (Figs. 2 and 6) and the collar 24 is of course rotated in the same direction by its engagement with pins 26. When it is desired to engage the clutch, the collar 24 is moved to the left in Fig. 1 by any suitable means such as a common clutch yoke and lever. Said collar is provided with a number of teeth 38, any one of which may engage one of or the other of the projections 19 and when so engaged exert a sudden torsional force on the projections 19 and the sleeve 18. This force is transmitted by the shoulder 31 to the spring 16 and from the spring 16 to the spring 13 by the interengagement of the inner ends of said springs. The torsional force is transmitted by the spring 13 to the shoulder 34 on the member 12 which serves as a stationary abutment since the inertia of the shaft and its connected members does not permit this relatively small force to start the rotation of the shaft. The transmission of the torsional force through the two springs expands the inner coils of both to engage the bore of the rotating bushing 21. The frictional effect of said bore on the outer surface of the coils of spring 16 is in the proper direction to wrap said spring more tightly about the sleeve 18 and thus tends to decrease the diameter thereof. The frictional force exerted by the bushing 21 on the inner coils of spring 13, on the other hand, tends to expand the spring into closer engagement with the bore of the bushing 21 and thus increases the frictional effect and causes the remaining turns of said spring to expand also and to grip said bore with sufficient force to start the rotation of the shaft 10 and to continue said rotation as long as the clutch collar 24 engages the projections 19 and as long as the direction of the driving force is maintained.

As the load is suddenly released from the shaft 10 at the end of the punching operation, said shaft tends to travel faster than the flywheel which has been materially slowed by the loss of the energy necessary for the punching operation. The directions of the frictional forces on the outer surfaces of the clutch springs is therefore reversed. The diameter of the spring 13 is decreased and that of spring 16 is increased to grip the internal bores of the bushing 21 and of the pocket member 14. The action is substantially instantaneous so that backlash is substantially eliminated.

When it is desired to declutch the apparatus the collar 24 is moved to the right to disengage the same from the projections 19. Thus the torsional force on the springs is removed and they resume their normal positions out of engagement with the bushing 21.

From the foregoing description it will be apparent that the two springs 13 and 16 serve as overrunning clutches, one of which is active when the force is transmitted from the flywheel to the shaft and the other when rotative force is transmitted in the opposite direction and that each spring serves as an actuator for the other. The action of the springs is so extremely rapid that the force required to be exerted on the projections 19 is very small. The force necessary to shift the collar 24 is of course smaller still. The provision of the cushion springs 28 serves to prevent the application of the external actuating force so rapidly that the outer coils of spring 16 are expanded before said force can overcome the inertia of the inner coils and press the innermost of said coils against that of spring 13. In many cases the use of the springs 28 will not be necessary. The construction is extremely rugged and wearing parts are few. The action of the springs is so rapid that there is little or no relative movement between them and the bushing 21 when the actuating force is applied and none at all after clutching. Wear on the springs is a minimum. The only rapidly engaging parts other than the springs are the teeth of the collar 24 and the projections 19. The force exerted between said parts at the time of engagement is only that which is necessary to overcome the inertia of spring 16 and to press the same against spring 13 with sufficient force to expand the very flexible inner coil of said spring.

The foregoing specification describes a preferred form of the invention the details of which may be varied within wide limits without departing from the scope of the invention as defined by the appended claims. For example, the driven and driving members may be interchanged for many installations. The construction shown in the drawing operates in exactly the same manner if the shaft 10 is the driving member and the member 11 is driven. In that case the direction of rotation is reversed.

The invention claimed is:

1. In a clutch construction, a driving and a driven member rotatable about a common axis, a helical spring seated in a bore in one of said members and engaging the other of said members for transmission of torque, externally operable means for applying a torsional force to said spring to expand the same against the internal surface of said bore for frictionally transmitting torque from said driving to said driven member, and a second helical spring seated in a bore in one of said members and engaging the other of said members for transmission of torque, said second spring frictionally engaging its associated bore to transmit torque from said driven member to said driving member to prevent backlash therebetween, said springs being coaxially arranged with their adjacent terminal coils interlocking for transmission of torsional forces from one to the other for expanding the same, whereby said external torsional forces tend to expand both of said springs.

2. In a clutch construction, a driving and a driven member rotatable about a common axis, a helical spring having a portion seated in a bore in one of said members and a second portion seated in a bore in the other of said members, a second helical spring having a portion seated in a bore in said one member and engaging said other member for transmission of torque, said springs being coaxially arranged and having their inner terminal coils operably connected to transmit torque from one to the other, means associated with said first spring to limit rotational movement thereof with respect to said other member, and externally operable means for applying a torsional force to said first spring and through said first spring to said second spring for expanding the same against the surfaces of said bores, whereby one of said springs may frictionally transmit torque from the driving member to the driven member and the other may transmit torque from the driven to the driving member to prevent backlash.

3. In a clutch construction, a driving and a driven member rotatable about a common axis, a pair of helical coiled springs forming overrunning clutch connections between said members, one of said springs being arranged for overrunning in one direction and the other arranged for overrunning in the opposite direction, said springs being coaxially positioned with their inner terminal coils operably connected for transmission of torsional forces therebetween, one of said springs having its outer terminal coil engaging one of said members for transmission of torque and the other having its outer terminal coil free for limited rotation with respect thereto, and externally operable means for applying a rotational actuating force to the outer terminal coil of said last mentioned spring and through said last mentioned spring to the first mentioned spring, said force tending to expand both springs into clutching relation with portions of said driving and driven members.

4. In a clutch construction, a driving and a driven member rotatable about a common axis, a pair of helical coiled springs forming overrunning clutch connections between said members, one of said springs being arranged for overrunning in one direction and the other arranged for overrunning in the opposite direction, and externally operable means for applying a torsional actuating force to one of said springs, said force being transmitted from said last mentioned spring to the other by interconnection of adjacent terminal coils thereof and tending to expand said springs into clutching engagement with portions of said driving and driven members.

WILLIAM CARLETON STARKEY.